United States Patent [19]
Chatterley et al.

[11] Patent Number: 5,450,738
[45] Date of Patent: Sep. 19, 1995

[54] METHOD AND APPARATUS FOR FORMING PIPING ELEMENT CONNECTIONS HAVING MULTIPLE OUTWARD STEPS

[75] Inventors: Charles N. Chatterley, Coventry; Michael W. Horgan, West Warwick, both of R.I.

[73] Assignee: Grinnell Corporation, Cranston, R.I.

[21] Appl. No.: 114,662

[22] Filed: Aug. 31, 1993

[51] Int. Cl.⁶ ............................................. B21D 41/02
[52] U.S. Cl. ..................................................... 72/106
[58] Field of Search ................... 72/105, 106, 117, 118

[56] References Cited

U.S. PATENT DOCUMENTS

| | | | |
|---|---|---|---|
| 1,541,601 | 6/1925 | Tribe . | |
| 2,267,533 | 12/1941 | O'Brien | 285/129 |
| 2,689,752 | 9/1954 | Webster | 285/94 |
| 3,191,416 | 6/1965 | Pritchett | 72/106 |
| 3,290,914 | 12/1966 | Vaill et al. | 72/117 |
| 3,995,466 | 12/1976 | Kunsman | 72/105 |
| 4,408,788 | 10/1983 | Beukema | 285/419 |
| 5,279,143 | 1/1994 | Dole | 72/105 |

FOREIGN PATENT DOCUMENTS

| 18201 | 6/1916 | United Kingdom | 72/105 |
|---|---|---|---|

OTHER PUBLICATIONS

"The Copper Connection" (Victaulic, May 1990), 12 pages.
"AWWA Standard for Grooved and Shouldered Joints" (American Water Works Association, May 1987) 10 pages.
"Expanded Pipe Coupling Style 24" (Victaulic, 1985), 4 pages.
"GRUVLOK® Products for Grooved Piping Sytems" (Grinnell Corporation, Sep. 1991), 60 pages.
"GRUVLOK® Pipe Machines" (Grinnell Corporation, Feb. 1992), 16 pages.

*Primary Examiner*—Lowell A. Larson
*Attorney, Agent, or Firm*—Fish & Richardson

[57] ABSTRACT

An apparatus for forming a piping element connection with multiple outward steps has first and second rollers, a driver for the second roller, and a positioning roller. The first roller rotates about a first axis, with first and second upper surfaces of rotation centered thereabout, the first surface mean diameter being less than that of the second surface. The first roller has an upper leading edge between the first and second upper surfaces. The second roller is mounted for rotation about a second axis parallel to the first axis, with first and second lower surfaces of rotation centered thereabout, the first surface mean diameter being greater than that of the second surface, and the second roller having a lower trailing edge between the first and second lower surfaces. The first and second rollers are mounted for movement together and apart in a plane of the first and second axes for engagement and forming of multiple outward steps in the piping element connection placed therebetween.

11 Claims, 6 Drawing Sheets

METHOD AND APPARATUS FOR FORMING PIPING ELEMENT CONNECTIONS HAVING MULTIPLE OUTWARD STEPS

BACKGROUND OF THE INVENTION

The invention relates to a method for joining tubing, fittings and valves of different standard diameter types.

For the purposes of the invention description presented herein, "CT" will be used to represent "standard water tube" size copper and copper alloy tubing, and "IP" will be used to represent "standard outside diameter" size steel pipe. In addition, the terms "tubing" and "pipe" are considered to be interchangeable, and reference to "copper tubing" will also be taken as referring to "copper alloy tubing" as an alternative.

A grooved end pipe coupling, e.g. of the type illustrated in FIG. 1, is used for joining together piping elements, e.g. tubing, fittings, valves, etc., in a leak tight assembly by use of grooves that are cut, cast or formed in the ends of the piping elements. Referring to FIGS. 2 and 3, critical parameters of a grooved end connection include: the gasket seat diameter, $D_s$, groove diameter, $D_g$, gasket seat width, $W_s$, and groove width, $W_g$. In the case of wrought metal piping elements, e.g., as above, tubing, fittings or valve bodies, the grooved end of the piping element, P, is conventionally produced by either a machining (cut) operation or a rolling (formed) operation as shown in piping element, $P_{cut}$, of FIG. 2, and piping element $P_{roll}$, of FIG. 3, respectively. In the case of a cast fitting or valve body, the grooved end connection is normally either cut in the configuration of a piping element, $P_{cut}$ shown in FIG. 2, or cast in the dual outward step configuration of a piping element, $P_{cast}$, shown in FIG. 4.

Referring again to FIG. 1, a typical grooved end pipe coupling 10 consists of two or more housing segments 12, 14, a gasket 16, and fastening means, e.g. nuts 18 and bolts 20 for securing the assembly together with the end connections to be joined. The housing segments have keys 22 around the inner periphery at both ends, a shoulder 24 also around and just inside of each key, and a gasket cavity 26. The keys fit into the grooves 30 to axially and transversely retain the end connections. The keys and shoulders are involved to varying degrees in maintaining the coupling assembly generally centered about the grooved end connection. The shoulder fits closely around the gasket seat diameter to prevent the gasket from extruding outwardly under the internal pressure of the piping system, the gasket being retained in the gasket cavity and producing a seal on the gasket seat surfaces to form a leak tight assembly.

Traditionally, copper tubing has been joined by soldering or brazing. However, recent emphasis on use of lead free solder has considerably increased the difficulty of producing a soldered, leak free joint, especially in the 3 inch and above tubing diameter sizes. This has increased the potential cost effectiveness of using grooved end pipe couplings in copper tubing system construction.

Until now, grooved end pipe couplings for joining copper piping elements (tubing, fittings, valves, etc.) have typically been available only in couplings specifically designed to accommodate CT size wrought copper tubing, which has average outside diameters that are slightly less than those for the same nominal IP size steel pipe (as detailed, e.g., in the publication "The Copper Connection" by The Victaulic Company of America). By way of example only, a 4-inch nominal CT size copper tube has an average outside diameter ("OD") of 4.125 inches, while 4-inch nominal IP size steel pipe has an average outside diameter of 4.500 inches.

In addition to the use of specifically designed grooved end pipe couplings, however, within the present state of the art, other means have been employed to join tubing with an average outside diameter smaller than the actual diameter of an IP size steel pipe of the same nominal diameter. For example, a specially designed ring with an average outside diameter equivalent to that of IP size pipe may be secured in a sealed arrangement to the end of a tube having a smaller average outside diameter, or the average outside diameter of the pipe can be increased to that of IP size pipe through the use of a ring secured in a sealed arrangement around the ends of lower average diameter pipe. These approaches would be similar to the Type A through E pipe end ring concepts shown in AWWA Standard C-606 for Grooved and Shouldered Joints.

Also, it has been known to expand the end of a pipe (roll forming), although the published objectives of this process have been to either expand the ends of IP size grooved end steel pipe to eliminate the reduced wall thickness of machined (cut) groove joints, or to eliminate the protrusion 32 inside the pipe which is associated with conventional roll grooving as shown in FIG. 3, and described in Table A, below.

Prior art concerning roll grooving of copper tubing is also described in the brochure "The Copper Connection", by Victaulic Company of America, with respect to their specially designed copper connections. These grooved end couplings are of the same basic concept or design as grooved end pipe couplings for IP size steel pipe; however, the dimensions of the couplings have been dimensionally altered to accommodate the smaller average outside diameter dimensions for copper tubing.

TABLE A

| Roll Groove Dimensions for Steel Pipe (Inches) | | | | |
|---|---|---|---|---|
| NOMINAL | $W_s$ | $W_g$ | $D_g$ | $D_s$ |
| 2 | .625 | .344 | 2.250–.015 | 2.375 |
| 2-½ | .625 | .344 | 2.720–.018 | 2.875 |
| 3 | .625 | .344 | 3.344–.018 | 3.500 |
| 4 | .625 | .344 | 4.344–.020 | 4.500 |
| 5 | .625 | .344 | 5.395–.022 | 5.562 |
| 6 | .625 | .344 | 6.455–.022 | 6.625 |

Tolerances:
$W_s$, $W_g = \pm.030$
$D_g = +.000$
$D_s =$ See OD tolerance in Table I (below).

Standard roll grooving reduces the internal diameter of the tubing at the roll groove and thereby increases the restriction to the fluid flow stream. This somewhat impedes fluid flow through the pipe and also creates an area for possible damage when used in abrasive media service. This process is also described in literature for the Victaulic Company of America Style 24 expanded pipe coupling, which is used to expand carbon steel pipe in abrasive service where the radially inward indentation created by standard roll grooving would be subject to excessive abrasion. This process, however, forms only the pipe end shoulder.

SUMMARY OF THE INVENTION

According to the invention, an apparatus for forming a piping element connection having multiple outward steps comprises a first roller mounted for rotation about a first axis, the first roller defining at least a first upper surface of rotation extending axially and centered about the first axis, and a second upper surface of rotation extending axially and centered about the first axis, the first upper surface having a mean diameter and the second upper surface having a mean diameter, the mean diameter of the first upper surface being less than the mean diameter of the second upper surface, and the first roller further defining an upper leading edge between the first upper surface and the second upper surface, a second roller mounted for rotation about a second axis parallel to the first axis, the second roller defining at least a first lower surface of rotation extending axially and centered about the second axis, and a second lower surface of rotation extending axially and centered about the second axis, the first lower surface having a mean diameter and the second lower surface having a mean diameter, the mean diameter of the first lower surface being greater than the mean diameter of the second lower surface, and the second roller further defining a lower trailing edge between the first lower surface and the second lower surface, means for driving the second roller to rotate about the second axis, and the first roller and the second roller mounted for relative movement together and apart in a plane of the first axis and the second axis for engagement and forming of multiple outward steps in a piping element connection placed therebetween, the first upper surface being disposed in substantial axial registration with the first lower surface, the second upper surface being disposed in substantial axial registration with the second lower surface, and the upper leading edge being offset axially from the lower trailing edge to provide a predetermined spacing dependent upon wall thickness of the piping element in which multiple outward steps are to be formed, and at least one positioning roller mounted for rotation about a third axis parallel to the first axis and offset from the plane of the first and second axes and having a surface positioned for engagement with an outside surface of the piping element.

Preferred embodiments of this aspect of the invention may include one or more of the following additional features. The first lower surface has a taper extending axially and inwardly from a region of the lower trailing edge, toward the second axis. Preferably, the taper has an angle of approximately 1° to 3°. The second roller further defines an end surface adjacent the first lower surface and spaced from the lower trailing edge, the end surface extending radially and generally perpendicular to the second axis. The apparatus further comprises a first positioning roller mounted for rotation about a third axis parallel to the first axis and offset to a first side of the plane of the first and second axes, and a second positioning roller mounted for rotation about a fourth axis parallel to the first axis and offset to a second side, opposite the first side, from the plane of the first and second axes and having a surface positioned for engagement with an outside surface of the piping element. Preferably, the third axis is spaced from the plane by a first positioning distance and the fourth axis is spaced from the plane by a second positioning distance greater than the first positioning distance.

According to another aspect of the invention, a method for forming multiple outward steps in a piping element connection comprises the steps of: (a) providing a forming apparatus as described above; (b) positioning an end of a piping element connection to be formed with multiple outward steps between the first roller and the second roller, with the end of the piping element connection engaged with the end surface of the second roller, the piping element connection axis being angularly offset from the second axis; (c) engaging opposite inner and outer surfaces of an end region of the piping element connection between the first roller and second roller while supporting the piping element connection at a point spaced from the end to be formed, the second roller being driven; (d) causing the upper leading edge of the first roller to engage the outer surface of the piping element connection in a manner to produce a torque to draw the piping element connection toward the end surface of the second roller; (e) applying force to urge the first roller and the second roller together with the first upper surface disposed in substantial axial registration with the first lower surface, the second upper surface disposed in substantial axial registration with the second lower surface, and the upper leading edge offset axially from the lower leading edge to provide a predetermined spacing to accommodate wall thickness of the piping element connection; (f) continuing application of force until the second upper surface of the first roller and the first lower surface of the second roller contact opposite wall surfaces of the piping element connection, and the angular offset of the axis of the piping element connection from the second axis is reduced to approximately zero; (g) moving apart the first roller and the second roller; and (h) removing the piping element connection in which multiple outward steps have been formed.

According to still other aspects of the invention, a piping element connection having multiple outward steps in at least one end is formed by the described method, and a wrought metal piping connection has multiple outward steps, e.g. roll-formed, in at least one end.

Objectives of this invention include providing a convenient, low cost means for joining "standard water tube" size wrought copper and copper alloy tubing, fittings and valve connections to any combination of each other through use of conventional grooved end pipe couplings sized for use with "standard outside diameter" size steel pipe; as well as providing for joining "standard water tube" size wrought copper and copper alloy tubing, fittings and valve connections with end connections of steel, or any other suitable strength material, manufactured in accordance with the outside diameter dimensions of "standard outside diameter" size steel pipe.

The objectives also include providing a process for expansion of a tube end in a manner that does not create a restriction in the tube which can impede the flow in any way, and which also does not produce an area for potential accelerated abrasive damage. In addition, the two step radial outward expansion of the process of this invention has another advantage of producing the groove diameter and reducing the thinning associated with the pipe or tube end expansion by prior art methods.

These and other features of the invention will be apparent from the following description of a presently preferred embodiment, and from the claims.

BRIEF DESCRIPTION OF THE DRAWINGS

FIG. 1 is a side section view of the coupling housing and gasket taken at the line 1A—1A of FIG. 1;

DESCRIPTION OF THE PREFERRED EMBODIMENTS

Figure 1:
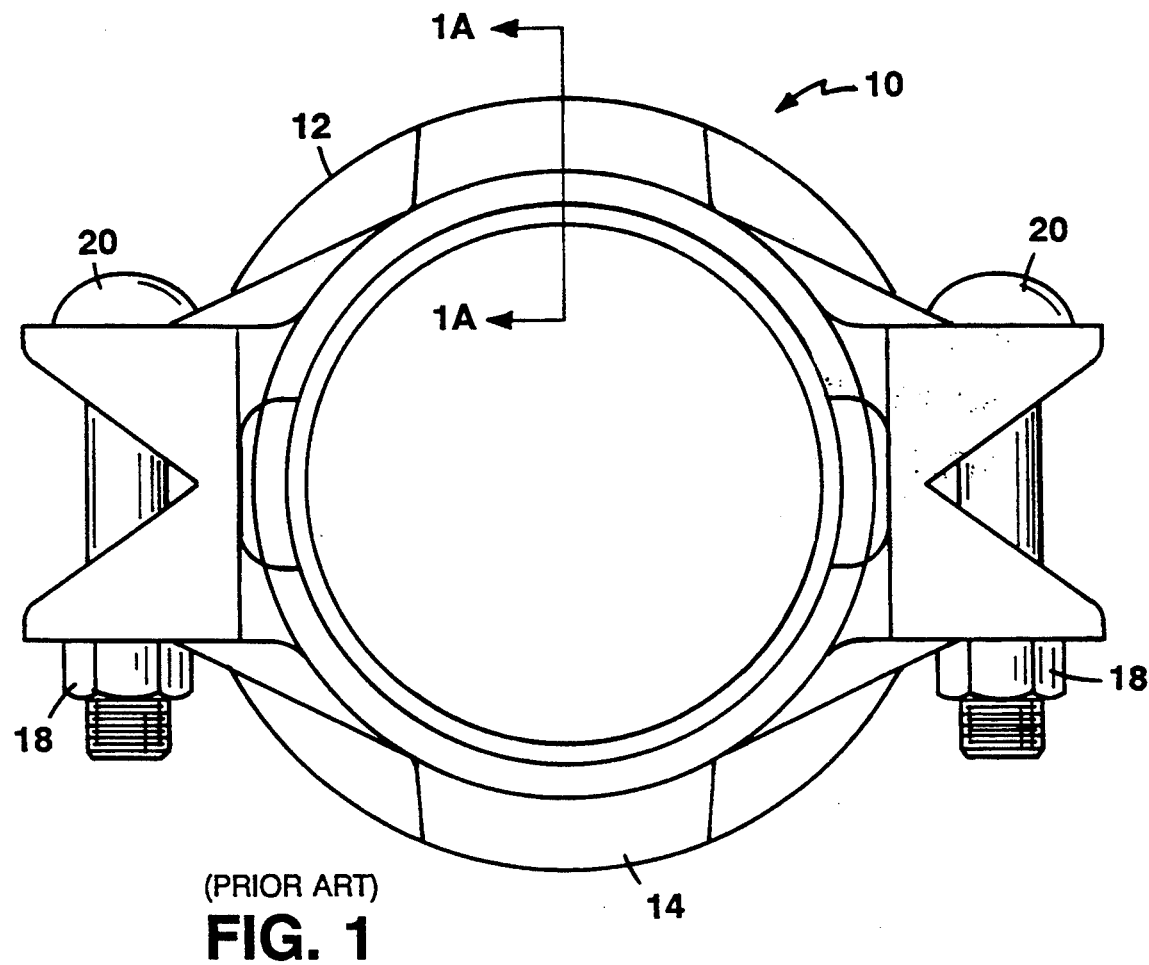
FIG. 1 is an end view of a typical prior art grooved end pipe coupling.
Figure 1A:
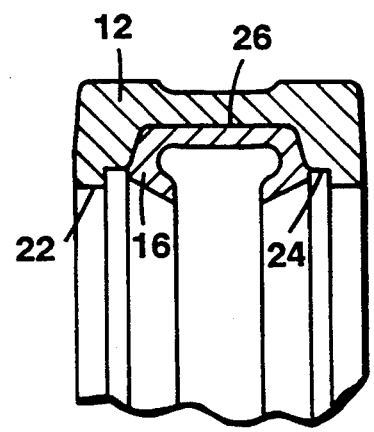
Figure 2:
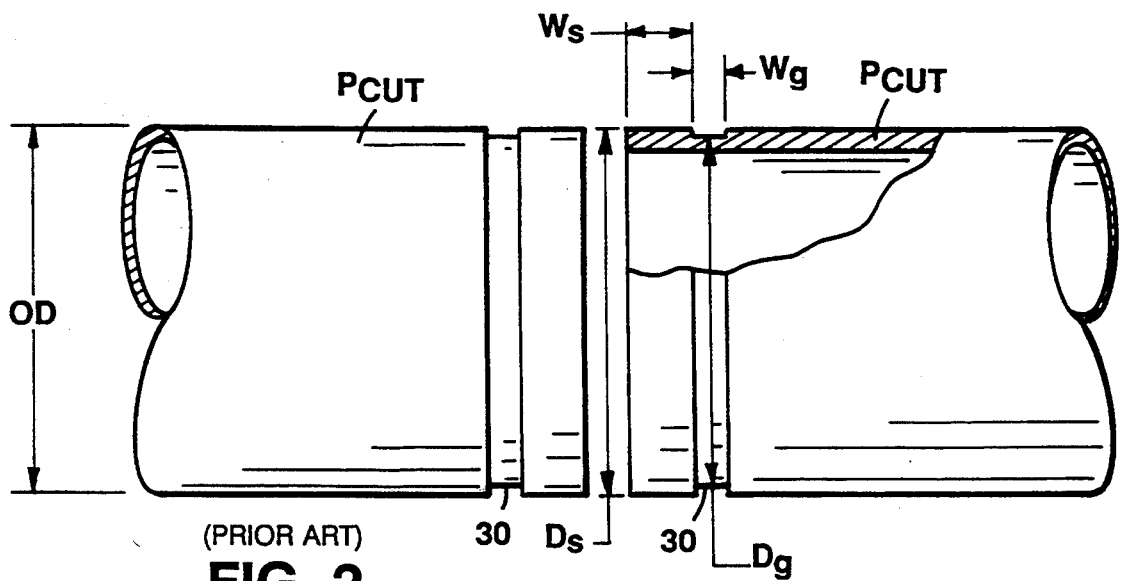
FIG. 2 is a side view of opposed ends of piping for a conventional cut grooved pipe end connection.

This invention provides a convenient, low cost method and apparatus for utilizing grooved end pipe couplings designed and used for many years with IP size steel pipe for the joining of CT size wrought copper piping elements, or with any other wrought metal piping elements having a connection with an average outside diameter equal to or less than the average groove diameter commonly used for IP size steel pipe.

Briefly, according to the method of the invention, the end of a piping element connection is expanded in two or more steps by roll forming the gasket seat diameter ($D_s$), groove diameter ($D_g$) and gasket seat width ($W_s$) to predetermined dimensions equivalent to those commonly used for grooved end IP size steel pipe connections.

The grooved piping industry has traditionally used the terms "groove width" and "groove diameter", and for the purpose of this describing this invention, these terms will be maintained, with "groove diameter" ($D_g$) representing the same surface as with conventional roll grooving and "groove width" ($W_g$) representing the width of the groove surface. A comparison of average outside diameters for IP size steel pipe and CT size copper tubing for the 2 through 6 inch sizes are shown in Tables I, II and III. The average outside diameter specifications for CT size tubing are given in ASTM B88, while the average outside diameters for IP size pipe are specified in ASTM A53, although other standards address these parameters as well.

Although the end connections of copper fittings and valve bodies can be formed in a manufacturing facility, it is important, in particular from a cost effective installation viewpoint, to be able to form the end connections of the copper tubing at an installation site.

TABLE I

Comparison of Average Outside Diameters For CT Size Tubing and IP Size Pipe in the 2-6 Inches Nominal Size Range

| Nominal Size (Inches) | Average Outside Diameters (Inches) | | | |
|---|---|---|---|---|
| | IP Size | Tolerance | CT Size | Tolerance |
| 2 | 2.375 | ±.024 | 2.125 | ±.002 |
| 2-½ | 2.875 | ±.029 | 2.625 | ±.002 |
| 3 | 3.500 | +.035/−.031 | 3.125 | ±.002 |
| 4 | 4.500 | +.045/−.031 | 4.125 | ±.002 |
| 5 | 5.562 | +.056/−.031 | 5.125 | ±.002 |
| 6 | 6.625 | +.063/−.031 | 6.125 | −.002 |

TABLE II

| NOMINAL | TYPE K ASTM B-88 | TYPE L ASTM B-88 | TYPE M ASTM B-88 | TYPE DMV ASTM B-306 |
|---|---|---|---|---|
| 2 | .083 | .070 | .058 | — |
| 2-½ | .095 | .080 | .065 | — |
| 3 | .109 | .090 | .072 | .045 |
| 4 | .134 | .110 | .095 | .058 |
| 5 | .160 | .125 | .109 | .072 |
| 6 | .192 | .140 | .122 | .083 |

TABLE III

Pipe Schedules Commonly Joined (Tube Wall Thickness (Inches))

| NOMINAL | SCH. 40 | SCH. 10 | SCH. 5 |
|---|---|---|---|
| 2 | .154 | .109 | .065 |
| 2-½ | .203 | .120 | .083 |
| 3 | .216 | .120 | .083 |
| 4 | .237 | .120 | .083 |
| 5 | .258 | .134 | .109 |
| 6 | .280 | .134 | .109 |

According to the method of the invention, the multiple step expansion or forming of the copper tubing end at the installation site is accomplished by use of a rolling operation which actually expands the end of the tube. The rolling operation can be performed at the installation site using roll grooving equipment that is generally used for the roll grooving of IP size steel pipe, where the roll grooving equipment is modified according to the invention.

Figure 5A:
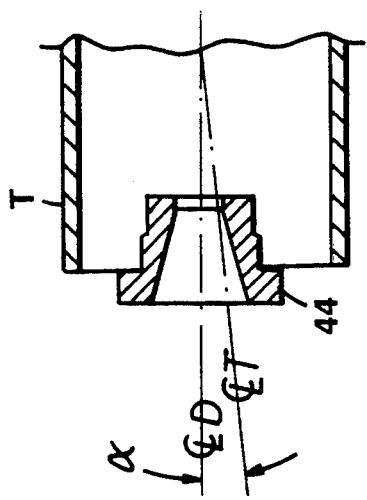
FIG. 5A is a top section view of the roll forming apparatus taken at the line 5A—5A of FIG. 5.
Figure 5:
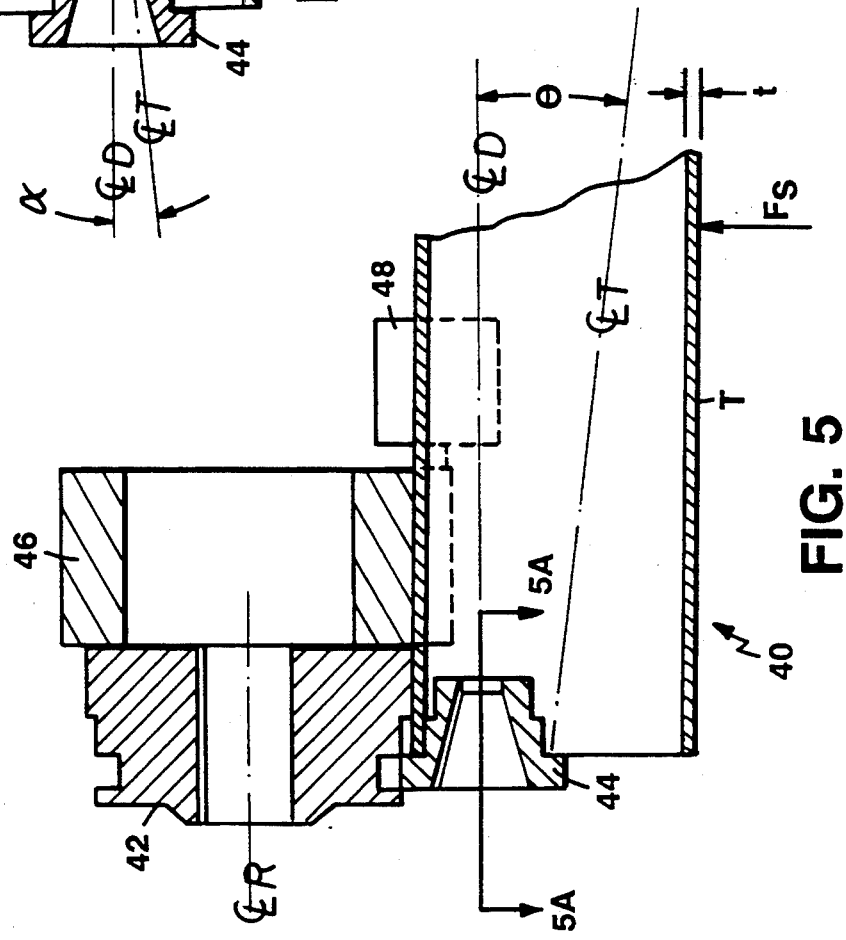
FIG. 5 is a side section view of a roll forming apparatus of the method, suitable for forming a dual outward step expansion in tubing according to the method of the invention.
Figure 5B:
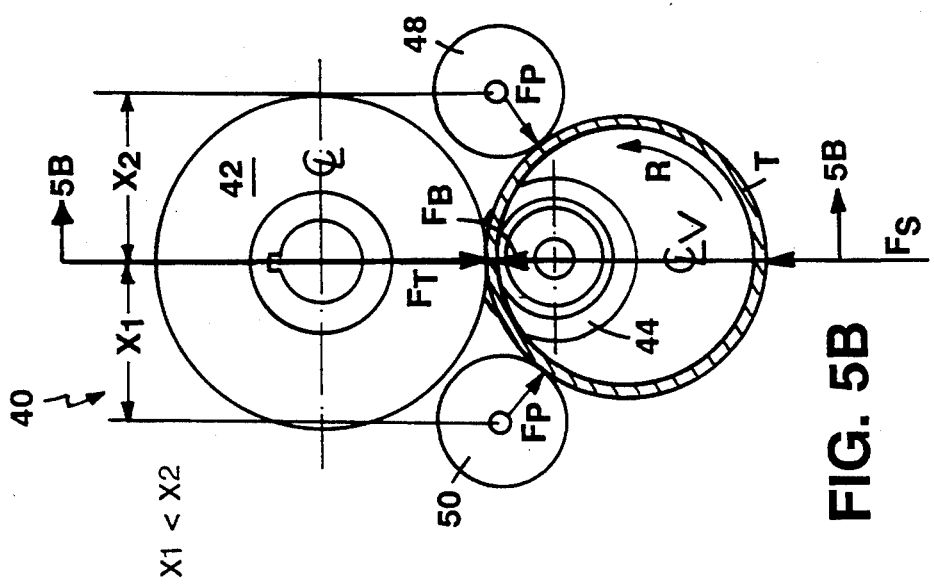
FIG. 5B is a front view of the roll forming apparatus showing the initial relationship of the bottom roller element of the roll forming apparatus of FIG. 5 and a tubing end to be formed according to the invention.

Referring to FIGS. 5, 5A and 5B, in the case of dual outward step expanded piping element connections, an apparatus 40 of the invention requires modification to the steel pipe roll grooving equipment to include specially designed, corresponding top (driven) roller 42 and bottom (driving) roller 44, and an additional bracket 46 (FIG. 7B) for securing two positioning rollers 48, 50.

The top and bottom rollers 42, 44 are made of a hardened steel and the rollers are designed to expand the end of the tube, T, through a rolling operation, rather than to form a groove or channel in the end of the pipe as generally done for IP size steel pipe. The positioning rollers 48, 50 hold the tube in position during the tube end expansion operation, and, furthermore, provide downward and lateral forces to the tube, T, to prevent it from spiraling out from between the top and bottom rollers 42, 44 during the forming operation. The components required for the dual outward step expansion, and the process for expansion, are described more fully below.

Figure 3:
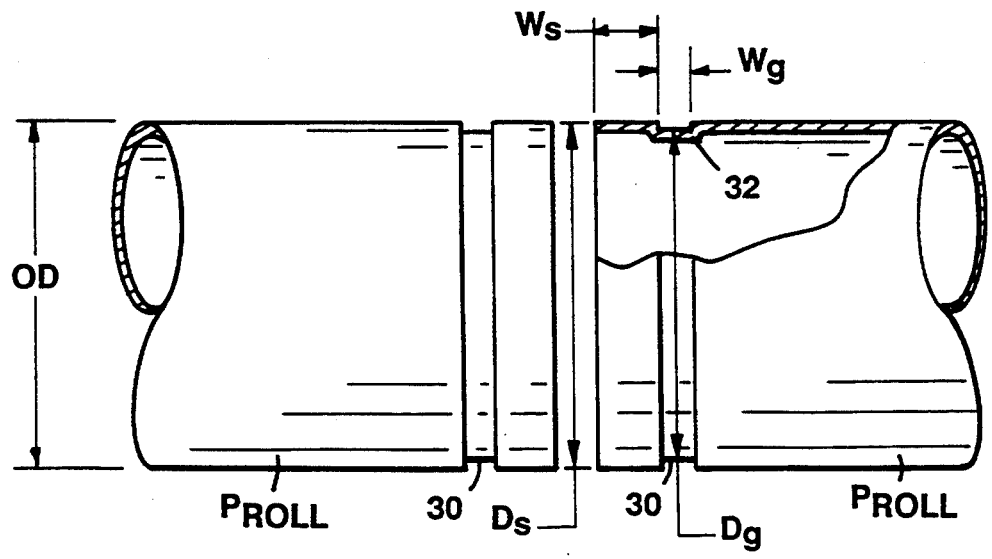
FIG. 3 is a side view of opposed ends of piping for a conventional roll grooved pipe end connection.
Figure 4:
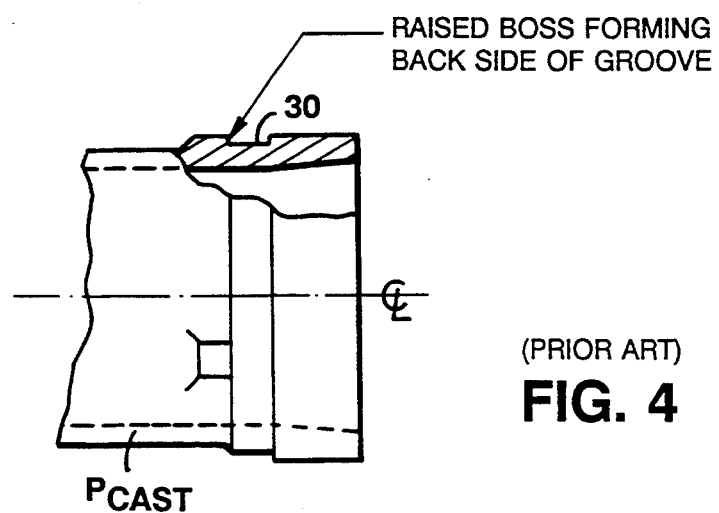
FIG. 4 is a side view of an end of a pipe for a conventional cast grooved pipe end connection.
Figure 6:
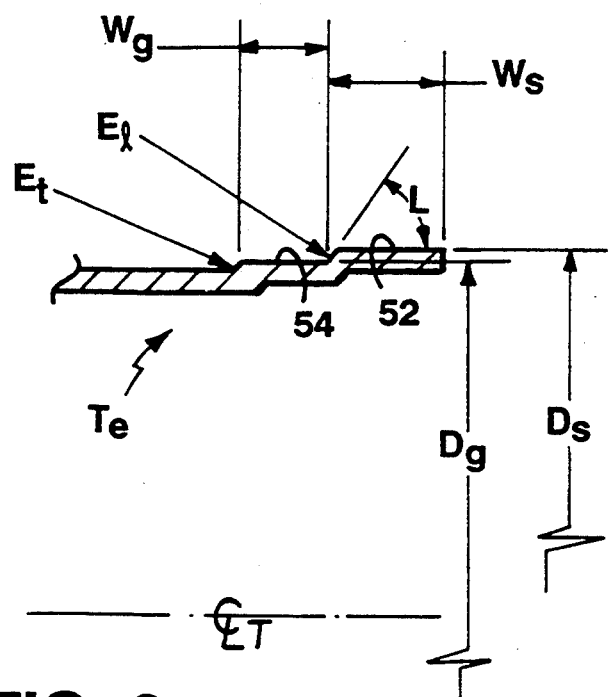
FIG. 6 is a side section view of a tubing end having a dual outward step expansion formed according to the process of the invention.

Referring now to FIG. 6, in the expansion of the tube end, $T_e$, to form the groove diameter ($D_g$) and gasket seat diameter ($D_s$) according to the invention, the tubing end is radially outwardly expanded in two areas, which is referred to as a dual step expansion. The first step in the expansion forms the gasket seat diameter (surface 52) and the second step forms the groove diameter (surface 54). The critical dimensions for roll grooving of IP size steel pipe are shown in FIG. 3, and the critical dimensions associated with the dual step roll forming expansion of CT size tubing are shown in FIG. 6. The thinning of the tube wall which would be associated with a single expansion of the tube is reduced by this dual step expansion of the invention.

The ability to produce acceptable outward steps at the end of the tube requires control of the gasket seat diameter ($D_s$), gasket seat width ($W_s$), groove diameter ($D_g$), groove width ($W_g$) and the cross sectional profile of the tube end.

Figure 7:
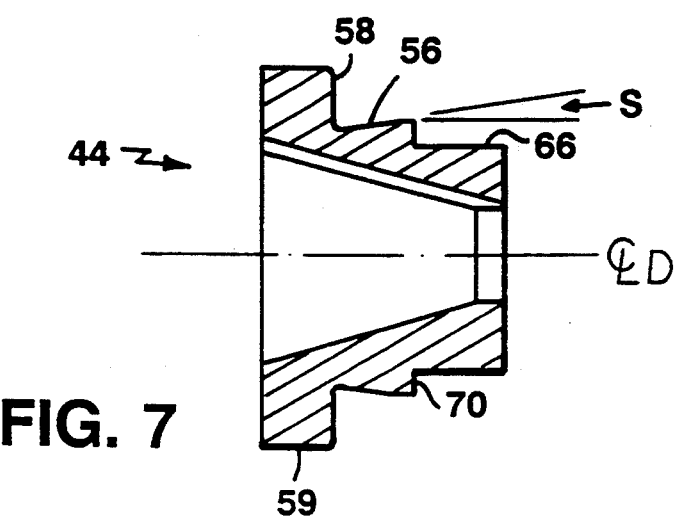
FIGS. 7 and 7A are respective side section views of the bottom (driving) roller element and the top (driven) roller element of a roll forming apparatus of the invention.

In the forming of the gasket seat diameter ($D_s$), a feature commonly referred to as "flare" must be controlled. Flare is the outward expansion of the gasket seat diameter outside of parallel with the centerline of the tubing ($\mathcal{L}_T$). It is measured as the maximum gasket seat diameter at the end of the tube. Excessive flare in CT size tubing can be more critical than in IP size pipe because the smaller wall thicknesses commonly associated with CT size tubing can allow one tube end to telescope into the other where there is excessive flare. The amount of flare can be controlled, and preferably eliminated altogether, by use of a suitable design for the bottom roller. As shown in FIG. 7, the surface 56 of the bottom roller 44 which forces the expansion of the gasket seat diameter is tapered slightly radially inwardly at angle, S (e.g., for practical purposes, approximately 1° to 3°) to distribute the tube forming load toward the back of the gasket seat. This slight inward taper is critical in the control of the amount of the tube end flare.

Roll forming of the gasket seat width ($W_s$), groove width ($W_g$) and cross-sectional profile of the dual outward step tube end are dependent upon the geometric relationship between the top and bottom rollers 42, 44, the dimensional configurations of the top and bottom rollers and the thickness, t, of the tube. The top and bottom rollers must be positioned to provide a predetermined spacing, $S_r$, between the upper leading edge of the top roller 64 and the lower trailing edge of the bottom roller 70, thereby allowing displacement of the tubing into this area during the tube end expansion operation. The spacing between the rollers is selected to be large enough to prevent the material of the wall from becoming too thin, or pinching, as the wall material is displaced between the rollers. A difference in the thickness of the tubing material will effect the amount of thinning and pinching that will occur. The top and bottom rollers are also dimensioned to provide the desired gasket seat width and groove width.

Referring again to FIG. 6, the shape of the tube end or connection profile is critical in maximizing the pressure retention capabilities of the coupling/connection joint. While the highest pressure retention capabilities can be achieved when the leading edge, $E_l$, of the gasket seat portion of expanded tube end is at perpendicular to both the groove diameter and to the seat diameter, this relationship is not advisable from a roll forming operation standpoint, as creation of a right angle can result in excessive pinching, especially with thinner tube walls. It has been determined that a more realistic leading edge angle, L, i.e. one providing adequate pressure retention capabilities in combination with minimal thinning of the tubing wall, will range from 50 to 85 degrees relative to the centerline of the tube ($\mathcal{L}_T$) and gasket seat diameter.

The dual outward step expansion roll forming process will now be described with reference to the FIGS. 8–11.

Figure 7A:
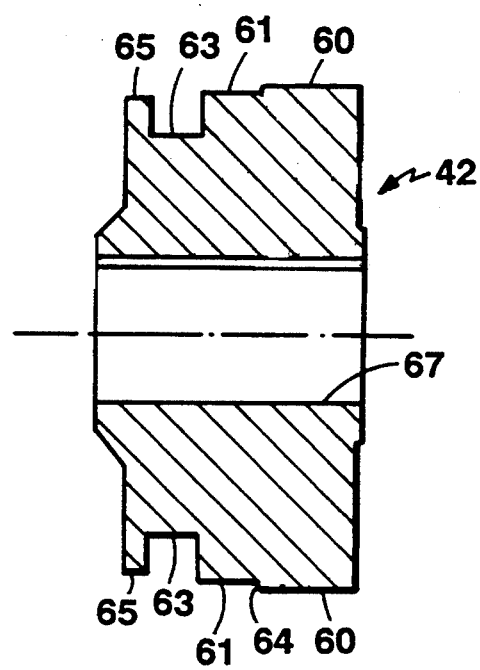
Figure 8:
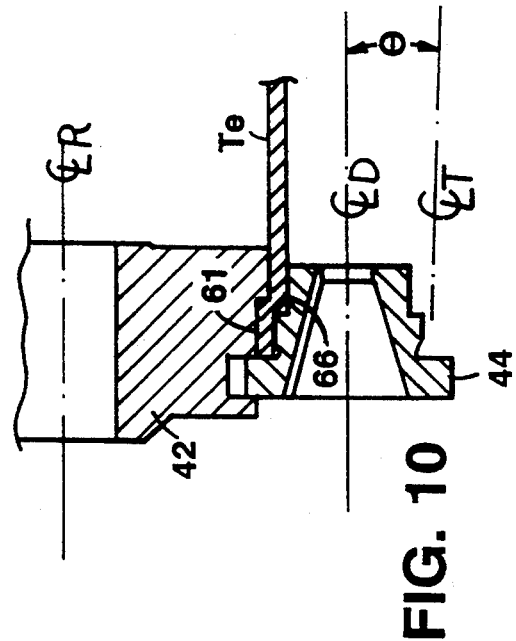
FIGS. 8, 9, 10, and 11 are sequential side section views of the roll forming apparatus of the invention showing the sequence of the dual outward step tube expansion process of the invention.

Phase 1:

Referring first to FIG. 8 (and also with reference to FIGS. 7 and 7A), tube, $T_e$, is positioned by the operator against the end surface 58 of the bottom roller 44 and rested on inwardly tapered surface 56. The top roller 42 is brought down by a force (pressure) actuated hydraulic actuator (not shown) and surface 60 of the top roller 42 is brought into contact with the outside surface 62 of the tube. At this point, the centerline of the tube ($\mathcal{L}_T$) is angularly offset vertically downward from the centerline ($\mathcal{L}_D$) of the driving or bottom roller 44 by the angle, $\Theta$ (approximately 1° to 2.5°). The tube has a tendency to drop, making angle $\Theta$ greater, unless an upward force is applied to support the tube. This support force can be provided by a pipe stand used to support longer tubes, or the operator can provide the required lifting force for shorter tube lengths. In FIG. 5A, the offset angle $\alpha$ is shown. This is the horizontal angle, between the centerline of the tube ($\mathcal{L}_T$) and the centerline of the bottom roller ($\mathcal{L}_D$), and is approximately 0.5° to 2° to the right when viewed with the driving roller 44 rotating counterclockwise (indicated by arrow, R, in FIG. 5B). Still referring to FIG. 5B, the centerline of each of the positioning rollers 48, 50 is located at unequal distances ($X_1$ and $X_2$) from the vertical centerline of the bottom roller ($\mathcal{L}_V$). The values of these dimensions will vary with the distance between the positioning rollers 48, 50 and the driving roller 44; however, typically the difference will be maintained in the range of 0.050 inch to 0.250 inch, and typically at about 0.125 inch. The placement of the tube, T, between the positioning rollers orients the centerline of the tube ($\mathcal{L}_T$) at an offset angle $\alpha$. The tube positioning with the offset angle $\alpha$ causes the upper leading edge 64 of the top or driven roller 42 to produce a torque which tends to draw the tube, T, inward between the top and bottom rollers 42, 44, preventing the tube from spiraling out. This technique is also applicable to the conventional roll grooving of IP size steel pipe.

Figure 9:
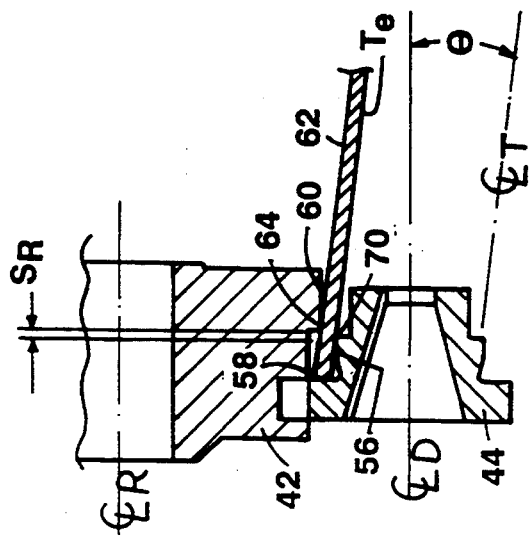

Phase 2:

Referring now to FIG. 9, as the top roller 42 is displaced downward towards the bottom roller 44, the gasket seat surface 52 starts to form through cold working of the tube wall material. The forces involved on the tube at this point are the vertical downward force ($F_T$) induced by surface 60 of the top roller 42, the vertical upward reaction force ($F_B$) maintained by surface 56 of the bottom roller 44, the two positioning forces ($F_P$) induced by the positioning rollers 48, 50, and the forces created by the dynamics of the rolling action of the top roller, bottom roller and the tube (see FIGS. 5, 5A and 5B for force locations). Since the vertical forces ($F_T$) and ($F_B$) are applied at offset locations along the longitudinal axis of the tube, a moment is created which tends to lift the tube off the support. In order to resist this tendency, it is necessary that a position roller 48 also be used on the right side of the driving roller 44 (when viewing the driving roller as rotating counterclockwise), in order to impose a resisting force to help keep the tube in proper orientation. As the end of the tube becomes deformed, the offset angle Θ is reduced. As described above, the surface 56 of the bottom roller 44 is tapered inwardly to distribute the reaction force ($F_B$) imposed by the bottom roller away from the end (tip) of the tube. As mentioned above, this taper is critical in controlling the amount of tube end flare.

Figure 10:
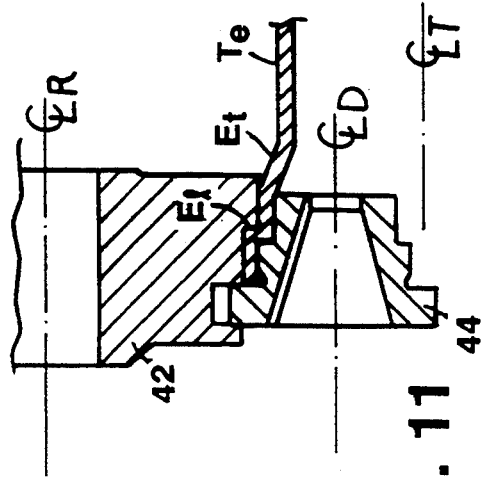

Phase 3:

Referring next to FIG. 10, the top roller 42 is further displaced by the force induced by the hydraulic actuator until the inside diameter of the tube comes in contact with surface 66 of the bottom roller 44 and surface 61 of the top roller 42 comes in contact with the outside diameter surface 62 of the tube T. It is desirable to have these two contacts occur almost simultaneously, as the top roller is displaced downward, and the downward displacement of the top roller should be stopped as soon as the contacts are made. This will reduce thinning of the tube. At this point, the gasket seat width ($W_s$) and the depth of the groove (i.e. the difference between the diameter of the seat ($D_s$) and the diameter of the groove ($D_g$)) have been defined and the vertical offset angle Θ has been further reduced. However, also at this point, Θ is approximately 0.4° to 1.6°. The forces imposed by the top and bottom rollers 42, 44 on the tube T are acting in the same direction as in Phase 2 (FIG. 9), although the forces are now distributed across the two additional surfaces, i.e. surface 66 of the bottom roller 44 and surface 61 of the top roller 42.

Figure 11:
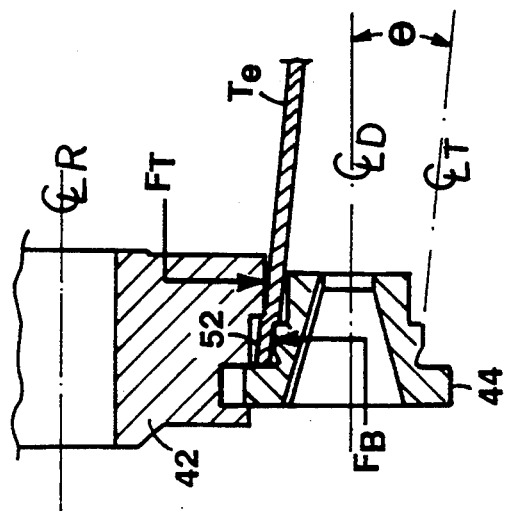

Phase 4:

Referring to FIG. 11, at the beginning of this phase, no additional force is required to create further downward movement of the top roller 42; however, the existing force induced by the hydraulic actuator is sufficient to cause a small amount of vertical downward movement of this top roller as the tube wall thickness reduces. This thinning of the tube wall causes the outside diameter of the tube to be locally expanded. The trailing edge, $E_t$, is formed by a combination of the forces which are trying to thin the tube wall and expand the tube diameter along with the forces which are resisting the tube expansion. These forces act in opposite directions to each other and form a transition area in the tube which is being referred to as the trailing edge. The rotation of the tube continues until the trailing edge is fully formed which occurs when the offset angle Θ is reduced to zero. At this point, the roll forming operation is complete, the top roller 42 is raised for removing the tube and the roll forming machine is turned off.

EXAMPLE

For the purpose of example only, the typical groove dimensions for a dual step, expanded end copper tube formed according to the method of the instant invention, are provided in Table B, shown below.

According to one preferred embodiment, the bottom roller 44 (FIG. 7) has an outer diameter of about 2.625 inches and an axial width of about 2.000 inches. The axial width of surface 59 is about 0.500 inch and the axial width of tapered surface 56 is about 0.563 inch. The maximum diameter of surface 56 is about 1.865 inches. The inner surface tapers at about 15°, from a diameter of 1.771 inches to 0.812 inch.

Referring to FIG. 7A, the top roller 42 has a maximum outer diameter (at surface 60) of about 5.218 inches and an axial width of about 2.779 inches. The axial width of surface 60 is about 1.028 inches. The outer diameter of surface 61 is about 5.064 inches and the axial width is about 0.625 inch. The outer diameter of surface 63 is about 4.121 inches and the axial width is about 0.535 inch. The outer diameter of surface 65 is about 4.877 inches and the axial width is about 0.250 inch. The inner bore 67 has a diameter of about 1.382 inches.

TABLE B

Groove Dimensions for Dual Step Flared Copper Tube (Inches)

| NOMINAL | $W_s$ | $W_g$ | $D_g$ | $D_s$ |
| --- | --- | --- | --- | --- |
| 2 | .625 | .344 | 2.250–.015 | 2.375–.015 |
| 2-½ | .625 | .344 | 2.720–.018 | 2.875–.018 |
| 3 | .625 | .344 | 3.344–.018 | 3.500–.018 |
| 4 | .625 | .344 | 4.334–.020 | 4.500–.020 |
| 5 | .625 | .344 | 5.395–.022 | 5.562–.022 |
| 6 | .625 | .344 | 6.455–.022 | 6.625–.022 |

Tolerances:
$W_s$, $W_g$ = ±.030

Figure 7B:
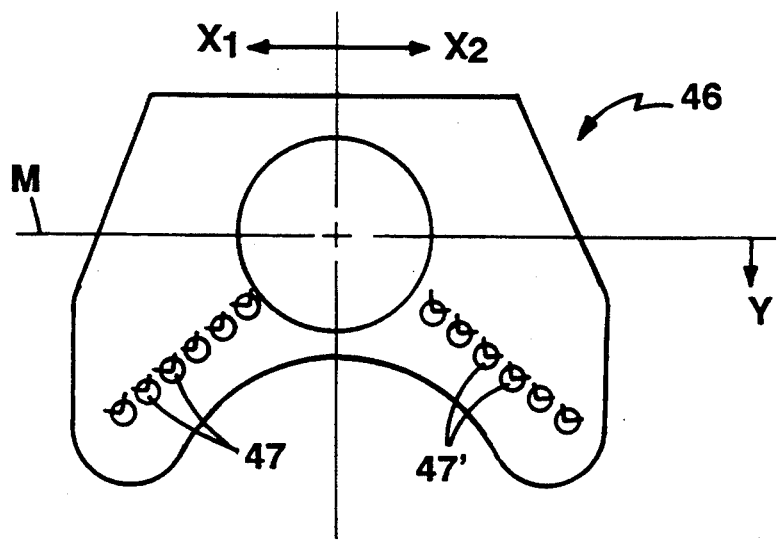
FIG. 7B is a face view of a positioning roller mounting bracket.

Referring to FIG. 7B, the positioning roller mounting bracket 46 defines sets of holes 47, 47' for fixing the positioning rollers 48, 50 with the desired spacing from the vertical centerline of the bottom roller ($X_1$ and $X_2$) and spacing below the center line, M, of the bracket mounting hole (Y), as described in Table C, below.

TABLE C

| | Positioning Roller Spacing (Inches) | | |
| --- | --- | --- | --- |
| NOMINAL | $X_1$ | $X_2$ | Y |
| 2 | 2.018 | 2.142 | 1.479 |
| 2-½ | 2.546 | 2.670 | 1.918 |
| 3 | 2.990 | 3.114 | 2.433 |
| 4 | 3.520 | 3.644 | 2.849 |
| 5 | 4.042 | 4.166 | 3.302 |
| 6 | 4.592 | 4.716 | 3.667 |

These and other embodiments of the invention are within the following claims. For example, while there is shown and described herein certain specific characteristics embodying the invention, it will be apparent to those skilled in the art that various modifications and rearrangements of the components may be made without departing from the spirit and scope of the fundamental inventive concept and that this inventive concept is not limited to the particular forms shown and described herein. As an example, it would be desirable to apply the dual outward step roll form expansion technique to any type of wrought metal tubing, fitting or valve body connection having an average outside diameter which is equal to or less than the average groove diameter commonly specified for IP size steel pipe, so that it could be joined to the latter using a grooved end pipe coupling designed for use with the particular IP size steel pipe of interest. In addition, the end connection of wrought metal tubing, fittings or valve bodies having an average outside diameter significantly smaller than the average groove diameter commonly specified for IP size steel pipe could be expanded in three or more steps. The first roller may be the driving roller with the second roller being the driven roller.

What is claimed is:

1. An apparatus for cold roll forming multiple, generally coaxial, outward steps in a circumferential wall of a piping element having a base circumference and a base wall thickness, said apparatus comprising an outside roller die mounted for rotation about a first axis, and an inside roller die mounted for rotation about a second axis, parallel to said first axis, said outside roller die defining a first outside roller surface of rotation extending axially and centered about said first axis, and at least a second outside roller surface of rotation extending axially and centered about said first axis said first outside roller surface having a mean diameter and said second outside roller surface having a mean diameter, the mean diameter of said first outside roller surface being less than the mean diameter of said second outside roller surface, and said outside roller die further defining an outside roller leading edge between said first outside roller surface and said second outside roller surface.

said inside roller die defining a first inside roller surface of rotation corresponding and opposed to said first outside roller surface, and extending axially and centered about said second axis, and at least a second inside roller surface of rotation corresponding and opposed to said second outside roller surface and extending axially and centered about said second axis, said first inside roller surface having a mean diameter and said second inside roller surface having a mean diameter, the mean diameter of said first inside roller surface being greater than the mean diameter of said second inside roller surface, and said inside roller die further defining an inside roller trailing edge between said first inside roller surface and said second inside roller surface, said first outside roller surface and said second roller surface positioned for engagement with an outside surface of the wall of the piping element, and said first inside roller surface and said second inside roller surface positioned for engagement with an inside surface of the wall of the piping element, said first outside roller surface and said second outside roller surface together with said first inside roller surface and said second inside roller surface defining a nip, said first axis, said second axis and said nip disposed in a common plane, said outside roller die or said inside roller die defining a stop wall with a stop surface spaced from said outside roller leading edge or said inside roller trailing edge, respectively, and said second outside or inside roller surface being relatively more spaced from said stop surface than said first outside or inside roller surface, respectively, said stop surface positioned for engagement by an end surface of the piping element, and said first inside roller surface further defining a tapering surface having a first diameter in a region of said inside roller trailing edge and a second diameter in a region of said stop surface, said first diameter being greater than said second diameter, and means for driving at least said outside roller die or said inside roller die to rotate about its respective axis, and means for urging together said outside roller die and said inside roller die, each being mounted for relative movement together and apart, in said plane of said first axis, said second axis and said nip, in a manner to engage the wall of a piping element disposed in said nip therebetween and applying sufficient compressive force for forming by cold rolling of multiple outward steps by reducing the thickness of the wall of the piping element connection disposed therebetween in said nip, said first outside roller surface being disposed in substantial axial registration with said first inside roller surface, and said second outside roller surface being disposed in substantial axial registration with said second inside roller surface, and said outside roller leading edge being offset axially from said inside roller trailing edge to provide a predetermined spacing dependent upon the base wall thickness of the piping element in which multiple outward steps are to be formed, whereby, during rotation of said outside roller die and said inside roller die, the wall thickness of the piping element is reduced about at least a first circumferential region of limited axial extent and a second region of limited axial extent, to increase the circumference of the piping element in the first and second circumferential regions by conservation of wall material, the degree of reduction of wall thickness, and the resulting circumference, in the first region between corresponding, opposed said first outside and inside roller surfaces being greater than the degree of reduction of wall thickness, and resulting circumference, in the second region between corresponding opposed said second outside and inside roller surfaces relatively more spaced from said stop surface, thereby to form by cold rolling multiple outward steps in a piping element connection placed in said nip between said outside and inside roller dies, the resulting circumference in the first region and the resulting circumference in the second region being greater than the base circumference and the resulting wall thickness in the first region and the resulting wall thickness in the second region being less than the base wall thickness.

2. The apparatus of claim 1 wherein said taper has an angle of approximately 1° to 3° relative to said second axis.

3. The apparatus of claim 1 wherein said stop wall comprises an end inside roller surface of said inside roller die adjacent said first inside roller surface and spaced from said inside roller trailing edge, said end inside roller surface extending radially outwardly and generally perpendicular to said second axis.

4. The apparatus of claim 1 wherein said apparatus comprises:
a first positioning roller mounted for rotation about a third axis parallel to said first axis and offset to a first side of said plane of said first axis, said second axis and said nip, and
a second positioning roller mounted for rotation about a fourth axis parallel to said first axis and offset to a second side, opposite said first side, from said plane of said first axis, said second axis and said nip and having a surface positioned for engagement with an outside surface of the piping element.

5. The apparatus of claim 4 wherein said third axis is spaced from said plane by a first positioning distance and said fourth axis is spaced from said plane by a second positioning distance different from said first positioning distance.

6. The apparatus of claim 1, wherein said apparatus further comprises at least one positioning roller mounted for rotation about a third axis parallel to said first axis and offset from said plane of said first and second axes and having a surface positioned for engagement with a surface of the piping element to hold the piping element with its axis at a predetermined offset angle.

7. The apparatus of claim 6 wherein said offset angle is approximately 0.5° to 2°.

8. The apparatus of claim 6, wherein said at least one positioning roller is positioned for engagement with an outside surface of the piping element.

9. The apparatus of claim 8 wherein said offset angle is approximately 0.5° to 2°.

10. The apparatus of claim 1, wherein the multiple outward steps formed by said apparatus are generally parallel to a centerline of a piping element in which said steps are formed by cold rolling.

11. A method for cold rolling a piping element having a base circumference and a base wall thickness to form multiple, generally coaxial, outward steps in a circumferential wall of the piping element, said method comprising the steps of:

a. providing a cold rolling apparatus comprising an outside roller die mounted for rotation about a first axis, and an inside roller die mounted for rotation about a second axis, parallel to said first axis, said outside roller die defining a first outside roller surface of rotation extending axially and centered about said first axis, and at least a second outside roller surface of rotation extending axially and centered about said first axis, said first outside roller surface having a mean diameter and said second outside roller surface having a mean diameter, the mean diameter of said first outside roller surface being less than the mean diameter of said second outside roller surface, and said outside roller die further defining an outside roller leading edge between said first outside roller surface and said second outside roller surface, said inside roller die defining a first inside roller surface of rotation corresponding and opposed to said first outside roller surface, and extending axially and centered about said second axis, and at least a second inside roller surface of rotation corresponding and opposed to said second outside roller surface and extending axially and centered about said second axis, said first inside roller surface having a mean diameter and said second inside roller surface having a mean diameter, the mean diameter of said first inside roller surface being greater than the mean diameter of said second inside roller surface, and said inside roller die further defining an inside roller trailing edge between said first inside roller surface and said second inside roller surface, the first outside roller surface and said second outside roller surface positioned for engagement with an outside surface of the wall of the piping element, and said first inside roller surface and said second inside roller surface positioned for engagement with an inside surface of the wall of the piping element, said first outside roller surface and said second outside roller surface together with said first inside roller surface and said second inside roller surface defining a nip, said first axis, said second axis and said nip disposed in a common plane, said outside roller die or said inside roller die defining a stop wall with a stop surface spaced from said outside roller leading edge or said inside roller trailing edge, respectively, and said second outside or inside roller surface being relatively more spaced from said stop surface than said first outside or inside roller surface, respectively, said stop surface positioned for engagement by an end surface of the piping element, and said first inside roller surface further defining tapering surface having a first diameter in a region of said inside roller trailing edge and a second diameter in a region of said stop surface, said first diameter being greater than said second diameter, and means for driving at least said outside roller die or said inside roller die to rotate about its respective axis, and means for urging together said outside roller die and said inside roller die, each being mounted for relative movement together and apart, in said plane of said first axis, said second axis and said nip, in a manner to engage the wall of a piping element disposed in said nip therebetween and applying sufficient compressive force for forming by cold rolling of multiple outward steps by reducing the base thickness of the wall of the piping element connection disposed therebetween in said nip, said first outside roller surface being disposed in substantial axial registration with said first inside roller surface, and said second outside roller surface being disposed in substantial axial registration with said second inside roller surface, and said outside roller leading edge being offset axially from said inside roller trailing edge to provide a predetermined spacing dependent upon the base wall thickness of the piping element in which multiple outward steps are to be formed;

b. positioning an end of a piping element connection to be formed with multiple, outward steps by cold rolling in the nip, with an end surface of the piping element engaged with said stop surface, with the piping element angularly offset away from the first and second axes;

c. while supporting the piping element at a point spaced from the end engaged in the nip, engaging the first and second outside roller surfaces of the outside roller die upon the outside wall surface of the piping element and engaging the first and second inside roller surfaces of the inside roller die upon the inside wall surface of the piping element;

d. driving the inside roller die while engaging the outside roller leading edge upon the outside wall surface of the piping element in manner to apply a torque to urge the piping element toward the stop surface; and e. during rotation of the outside and inside roller dies, applying force to urge the outside roller surface of the outside roller die and the inside roller surface of the inside roller die together, reducing the base wall thickness of the wall of the piping element about at least a first circumferential region of limited axial extent, corresponding generally to the opposed first outside and inside roller surfaces, and a second region of limited axial extent, corresponding generally to the opposed second outside and inside roller surfaces relatively more spaced from the stop surface, to increase the circumference of the piping element in the first and second circumferential regions by conservation of wall material, with the degree of reduction of wall thickness, and the resulting circumference, in the first region being greater than the degree of reduction of wall thickness, and resulting circumference, in the second region, thereby to form by cold rolling multiple outward steps in a piping element connection placed in the nip between the outside and inside roller dies, the resulting circumference in the first region and the resulting circumference in the second region being greater than the base circumference and the resulting wall thickness in the first region and the resulting wall thickness in the second region being less than the base wall thickness.

* * * * *

UNITED STATES PATENT AND TRADEMARK OFFICE
CERTIFICATE OF CORRECTION

PATENT NO.   : 5,450,738

DATED        : September 19, 1995

INVENTOR(S)  : Charles N. Chatterley and Michael W. Horgan

It is certified that error appears in the above-identified patent and that said Letters Patent is hereby corrected as shown below:

Col. 6, Table 1, line 6, "-.002" should be --±.002--.

Col. 6, Table 11, after "Table 11", insert --Tubes To Be Joined (Tube Wall Thickness (Inches)).

Col. 11, line 5, after "axis" insert --,--.

Col. 11, line 14, "surface." should be --surface,--.

Col. 11, line 32, before "roller" insert --outside--.

Col. 14, line 9, after "defining" insert --a--.

Signed and Sealed this

Sixteenth Day of July, 1996

Attest:

BRUCE LEHMAN

Attesting Officer

Commissioner of Patents and Trademarks